United States Patent [19]

Menary

[11] 3,768,750

[45] Oct. 30, 1973

[54] AUTOMATIC THREADING FILM REEL

[75] Inventor: Robert F. Menary, Northbrook, Ill.

[73] Assignee: Paulman Incorporated, Northfield, Ill.

[22] Filed: Dec. 30, 1971

[21] Appl. No.: 214,153

[52] U.S. Cl. .............................................. 242/74.2
[51] Int. Cl. .............................................. B65h 75/28
[58] Field of Search .................... 242/74, 74.1, 74.2, 242/71.8

[56] References Cited

UNITED STATES PATENTS

| | | | |
|---|---|---|---|
| 1,861,882 | 6/1932 | Ross | 242/74.2 |
| 3,591,102 | 7/1971 | Leitz | 242/74 |
| 3,323,746 | 6/1967 | Mouissie | 242/74.2 |

FOREIGN PATENTS OR APPLICATIONS

| | | | |
|---|---|---|---|
| 746,720 | 3/1956 | Great Britain | 242/74.1 |

*Primary Examiner*—George F. Mautz
*Assistant Examiner*—Edward J. McCarthy
*Attorney*—Guy A. Greenawalt

[57] ABSTRACT

A reel for motion picture film which is characterized by a pair of circular side plates or flange members and a connecting hub structure for supporting the same on a spindle, with the plates having cut therein radially extending, circumferentially spaced spring fingers which are arranged in oppositely disposed, paired relation and which have free inner ends adapted to seat in radial recesses in the hub structure so that in the normal nonloaded condition a radial path is defined by each pair of fingers of decreasing width in the direction of the hub structure whereby when the leading end of the film is fed between the fingers and the reel is rotated the edges of the film will be gripped and the film will be forced down between the resilient fingers until it is seated on the hub structure by subsequent lapping of the film, resulting in automatic threading.

2 Claims, 5 Drawing Figures

PATENTED OCT 30 1973

3,768,750

AUTOMATIC THREADING FILM REEL

This invention relates to apparatus for storing motion picture film, recording tape, or the like, and is more particularly concerned with improvements in film or tape reel structures.

Reel structures have heretofore been provided for storing lengths of motion picture film, or recording tape, or like products, which comprise a hub structure for supporting the reel on a driving spindle, or the like, with a tape supporting edge somewhat wider than the width of the film or tape and parallel spaced side flanges or plates between which the film or tape is wound. Generally the hub structure has been provided with a radial slot in which the leading end of the film is adapted to be manually inserted so as to be trapped therein and anchored by lapping of the film when the reel is rotated or which is anchored by some positive holding means. With this arrangement manual threading is required and generally provision must be made by cutting away portions of the side plates or flange members for finger access to the end gripping arrangement on the hub structure so as to enable the film to be threaded thereon. Some effort has been made to design a reel structure which would enable the threading to be more easily accomplished, however, most designs heretofore proposed have not been satisfactory. It is a general object, therefore, of the present invention to provide a reel structure having provision for threading the leading end of a film or tape with a minimum of manual operations.

It is a more specific object of the invention to provide a reel structure for motion picture film, recording tape, or the like, which requires only that the leading end of the film be placed between the reel's side plates and moved a short distance toward the hub with subsequent rotation of the reel resulting in automatic gripping of the film end and anchoring of the same on the hub.

Another object of the invention is to provide a reel structure for motion picture film, or the like, which comprises a hub structure with parallel spaced side plates or flanges between which the film is adapted to be received and a plurality of circumferentially spaced, radially disposed, inwardly extending spring fingers which are arranged in paired relation so as to provide a radial path for the film which decreases in width toward the reel hub and which will resiliently grip the edges of the leading end of the film and permit the same to be forced down onto the hub by subsequent lapping of the film as the reel is rotated.

These and other objects and advantages of the invention will be apparent from a consideration of the reel structure which is shown by way of illustration in the accompanying drawings wherein.

Figures 1, 2, 3, 4, 5:
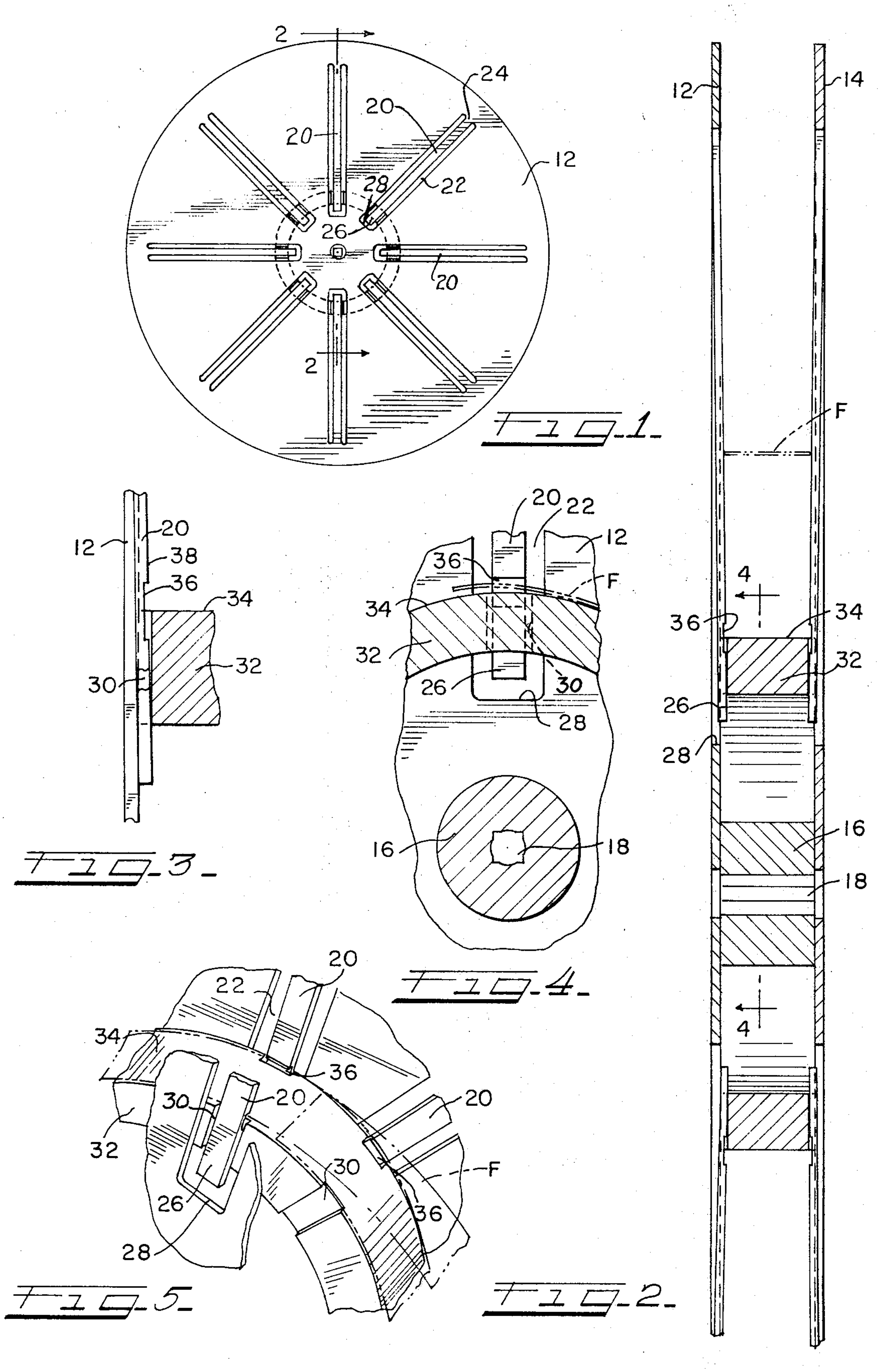
FIG. 1 is an elevational view of a film reel which incorporates therein the principal features of the invention.
FIG. 2 is a sectional view taken on the line 2—2 of FIG. 1, to an enlarged scale.
FIG. 3 is a fragmentary view showing a portion of the reel structure shown in FIG. 2, to a greatly enlarged scale.
FIG. 4 is a sectional view taken on the line 4—4 of FIG. 2, to an enlarged scale.
FIG. 5 is a perspective view illustrating the threading of the film on the reel.

The reel structure 10 which is illustrated in the drawings is particularly adapted for storing moving picture film, or similar film or tape material, which is generally thin and which is sufficiently flexible to be wound into a coil.

The reel 10 comprises a pair of parallel, spaced, side plates or flange forming members 12 and 14 which are of identical construction except for being right and left hand members when positioned in reel forming relation on opposite faces of a cylindrical hub structure 16, the latter having an axial bore 18 so as to adapt the reel for support on a spindle. The side plate members 12 and 14 may be secured to the hub structure 16 in any suitable manner, such as, by screw fasteners or the like.

Each of the side plate members 12 and 14 is provided with a series of radially extending spring fingers 20. In the form of the reel shown the plate members 12 and 14 are of relatively thin metal material having sufficient resiliency for cutting therein spring fingers 20. The fingers 20 are formed by cutting therein the U-shaped slots 22 leaving each finger 20 anchored at 24 near the periphery of the plate and having a free end 26 extending to a point short of the inner end 28 of the slot 22. Each finger 20 is relatively narrow and is bent so as to spring inwardly toward the opposite plate and with the free end normally seated in a recess 30 in an outer hub section or ring member 32 on the outer face 34 of which the film is adapted to be wound. Each finger 20 has a relatively shallow recess 36 cut in the inner face 38 thereof. The recess 36 is located so that it extends a short distance outwardly of the face 34 of the ring member 32 as shown in FIG. 3. The axial dimension of the face 34 of the hub member 32 between the recesses 30 is less than the width of the film for which the reel is designed so that when a film section F is threaded between a pair of the oppositely disposed spring fingers 20, as shown in FIG. 2, and forced toward the hub member 32 the fingers 20 will resiliently grip the opposite edges of the film F. When the reel is rotated the film F will be forced down onto the hub face 34 and the film edges will seat in the finger recesses 36. Unwinding will be prevented by the resiliency of the fingers 20 and the film overlapping which will occur with continued rotation of the reel. The decreasing width of the radial path provided by the pairs of co-operating, oppositely disposed fingers 20 results in the film end being gripped as it is moved toward the hub surface 34 by accumulated lapping and tension in the film due to pull exerted by rotation of the reel so that automatic anchoring of the film end results.

In using the reel 10 it will be placed on a supporting spindle, normally, which is driven to rotate the reel. The leading end of the film F will be directed between the reel side plates 12 and 14 in a path which is in the plane of the reel, and at a radial distance from the hub structure which will result in the side edges of the film being engaged between a pair of the spring fingers 20, so that upon rotation of the reel the film will be gripped by successive pairs of the fingers 20 and subsequently forced down onto the surface 34 of the hub structure by lapping of the film. The initial positioning of the film leading end section may, of course, be accomplished manually without having finger access to the hub structure, while some resistance to advance of the film will be necessary in order to exert sufficient tension to force the film down onto the hub surface against the resiliency of the fingers 20.

Since the only requirement for threading is the positioning of a leading section of the film so that is will be gripped between a pair of the fingers 20 as the reel is rotated the threading is essentially automatic.

I claim:

1. A storage reel for flexible strip material which comprises a pair of side plates and a connecting hub structure for supporting the same on a spindle said side plates having cut therein circumferentially spaced pairs of spring fingers which extend radially inwardly of an integral anchoring point with the fingers of each pair arranged in oppositely disposed relation and with their free inner ends extending to the hub structure so that in the normal non-loaded condition a radial path is defined by each pair of fingers which gradually decreases in width in the direction of the hub structure to an amount less than the width of the strip material, said hub structure comprising an outer ring member having end faces with radially extending slots, therein in the said end faces co-operating with portions of said side plates to provide pocket forming recesses for receiving the free ends of said spring fingers, said spring fingers each having a recess of substantial depth adjacent the inner end which faces in the direction of the associated slotted end face of said ring member, whereby when the leading end portion of the strip material is fed between the fingers and the reel is rotated the spring fingers will resiliently grip the edges of the strip material at a substantial distance from the hub structure and the strip material end portions will be forced down between the resilient fingers until it is seated on the hub structure with the side edge portions of the strip material extending into the recesses in the ends of said spring fingers by subsequent lapping of the strip material, resulting in automatic threading of the strip material on the reel.

2. A storage reel as set forth in claim 1 wherein the recesses in the inner ends of said spring fingers are formed to provide abutment formations facing in the direction of the hub structure and spaced outwardly thereof for restraining the strip material against outward movement when it is lodged between said abutment formations and the hub structure.

* * * * *

PO-1050
(5/69)

UNITED STATES PATENT OFFICE
CERTIFICATE OF CORRECTION

Patent No. 3,768,750 Dated October 30, 1973

Inventor(s) Robert F. Menary

It is certified that error appears in the above-identified patent and that said Letters Patent are hereby corrected as shown below:

In the heading, the name of the assignee is PAULMAR and not "PAULMAN"

Column 3, line 19, delete the comma after "slots" and insert a comma -- , -- after "therein"

Signed and sealed this 5th day of March 1974.

(SEAL)
Attest:

EDWARD M.FLETCHER,JR.
Attesting Officer

C. MARSHALL DANN
Commissioner of Patents